Jan. 24, 1961
S. E. GREGOIRE ET AL
2,969,420
HIGH TEMPERATURE LEAD ASSEMBLY
Filed Oct. 1, 1957
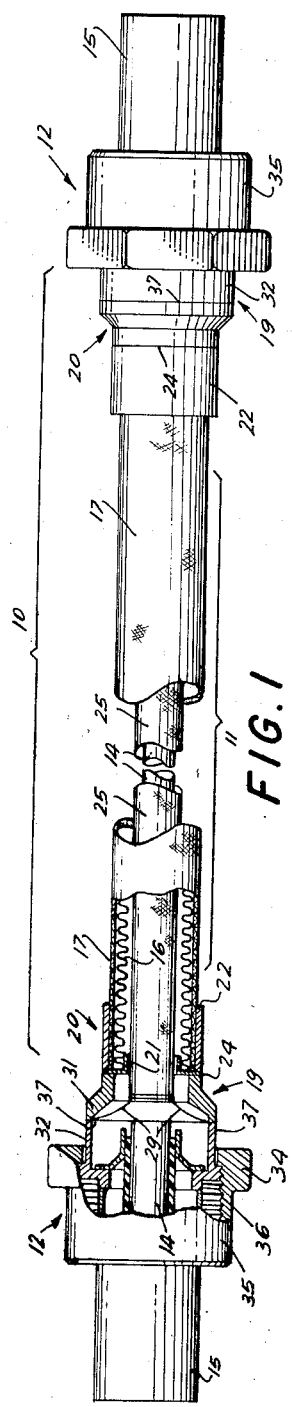
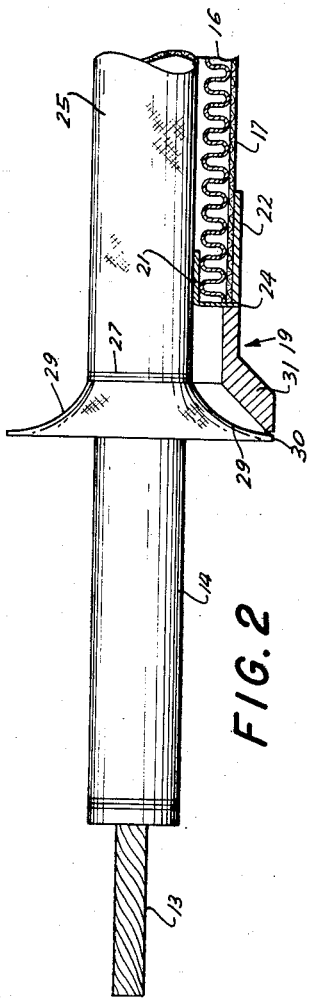
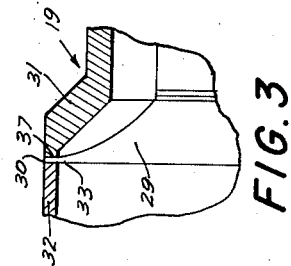
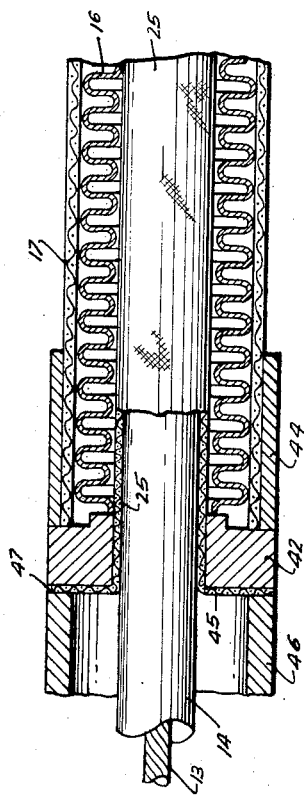
INVENTORS.
STEPHEN E. GREGOIRE
PAUL A. BLACKINGTON
BY
*Bauer and Seymour*
ATTORNEYS

United States Patent Office 2,969,420
Patented Jan. 24, 1961

2,969,420

HIGH TEMPERATURE LEAD ASSEMBLY

Stephen E. Gregoire and Paul A. Blackington, Sidney, N.Y., assignors to The Bendix Corporation, a corporation of Delaware Filed Oct. 1, 1957, Ser. No. 687,416

7 Claims. (Cl. 174—75)

This invention relates to a terminal connection for a conduit, and more particularly relates to a hermetically sealed terminal connection for a shielded conduit.

The invention has among its objects the provision of a novel terminal connection for a conduit element.

Another object of the invention resides in the provision of a shielded conduit element having a terminal member secured thereto by a novel connection.

Yet another object lies in the provision of a novel improved connection between a shielded conduit and a terminal member, the connection being such as to provide a hermetic seal between the parts and to effect the substantially continuous shielding thereof.

Still another object resides in the provision of an improved connection between a gas-tight and shielded conduit element and a terminal fitting therefor, the connection being simple, rugged and thus having long life under arduous service conditions, and being simple and economical to make.

The above and further objects and novel features of the invention will more fully appear from the following description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views:

Fig. 1 is a view in side elevation of a conduit element having a flexible conduit with terminal fittings secured to its ends by connecting means made in accordance with the invention, a portion of the conduit, the terminal fitting, and the connecting means therebetween at the left being shown in generally axial section, a central portion of the conduit being broken away;

Fig. 2 is an enlarged fragmentary view of a portion of the conductor wire and its sheath in the vicinity of the connection between the conduit and a terminal fitting, a fragment of the end of the conduit and of the end piece connected thereto being shown in section;

Fig. 3 is an enlarged view of a portion of the connection between the conduit and the terminal fitting, the view particularly showing the connection between the end piece on the conduit, the sleeve on the terminal fitting, and the shielding sheath on the conductor wire; and Fig. 4 is a fragmentary view of another embodiment of a connection between a conduit and a fitting, said connection being made in accordance with the invention.

In many instances it is desirable that conductor wires or cables for use, for example, in aircraft installations be encased in flexible, gas impermeable conduits. Because of mechanical considerations, such as strength and resistance to corrosion, it is desirable to make at least the flexible impermeable wall of the conduit of metals such as stainless steel, and to make the housing parts of the terminal fittings on the conduit, which are hermetically sealed to the conduit, of a similar metal. The resulting construction is excellent for mechanical and corrosion resistance standpoints but, because the electrical conductivity of stainless steel and the like is not particularly good, such conduit element and its terminal fitting would have somewhat less than ideal radio shielding if reliance for such shielding were placed solely upon the impermeable metal wall of the conduit and upon the metal housing of the terminal fitting.

To provide the conduit with better shielding characteristics, the impermeable flexible wall thereof is, therefore, supplemented by an outer sheath of braided metal wire of relatively high conductivity. Usually tinned copper wires or nickel wires are employed for this purpose. A typical conduit of the type described is shown in Blaisdell application Serial No. 687,419, filed October 1, 1957. Such application discloses and claims an improved connection between the end of such a conduit and a terminal fitting. The present invention, which if desired may be employed in conjunction with the invention of application Serial No. 687,419, provides still more efficient shielding of the conductor wire or cable than is provided merely by the sheath on the flexible conduit, and provides for more nearly continuous shielding of the wire or cable in the part thereof immediately adjacent and including the zone of the terminal fitting.

Briefly, the invention provides an additional shielding sheath disposed immediately about the insulated conductor wire or cable and within the conduit, and also provides means whereby the shielding sheath of the conduit and the shielding sheath of the conductor wire are electrically connected in parallel whereby markedly to increase the total shielding effect on the conductor wire. The invention further provides a simple manner of both hermetically sealing the end of the conduit to the metal housing of a terminal fitting and of electrically connecting the above mentioned two sheaths together and to the housing of the fitting.

Turning now to the first embodiment of the invention shown in the drawings, in Fig. 1 there is shown a conduit element, generally designated 10, which includes an elongated flexible conduit 11 having a terminal fitting generally designated 12 connected to each end thereof. Extending longitudinally within conduit 11 is a conductor wire or cable which, in this instance, is a single central wire 13 having a layer of insulating material 14 disposed thereabout. The wire 13 is connected to a contact member, not shown, disposed within and insulated from an extension sleeve 15 which forms a part of the housing of terminal connector 12. The element 10, may, for example, be a disconnectable part of a high tension ignition circuit, and may have a pin contact (not shown) within one fitting 12 and a mating socket contact at the other such fitting. In the embodiment shown, fitting 12 has a first, inner housing part having a flanged sleeve 32 which is attached to the end of conduit 11, in a manner to be described, and a second, outer part 35 rotatably mounted thereon. Part 35 has a flange 34 lying inwardly of and engaging the flange on sleeve 32, and is internally threaded at 36 to permit attachment to an externally threaded mating fitting, not shown.

The flexible conduit 11 in the embodiment shown has an inner transversely corrugated flexible, impermeable metal tube 16, and an outer shielding sheath 17 closely fitting thereover. Tube 16 may be made for example of stainless steel, to secure the desired resistance to corrosion and to crushing, and sheath 17 may be made, for example, of braided nickel or tinned copper wire. Each end of conduit 11 is provided with an end member 19 secured thereto by a joint, generally designated 20, which may be made in accordance with the invention of the above referred to application Serial No. 687,419. Joint 20 includes a diaphragm member 21 which has an axially extending sleeve portion which closes the radially inner end of the first complete corrugation of tube 16 at the end of the conduit, and a radially outwardly directed flange which is interposed between the end surface of end member 19 and the confronting end of a metal sleeve 22 which overlies sheath 17. The conduit end member 19, the radial flange of diaphragm 21, and sleeve 22 are secured together and hermetically sealed by an annular weld 24. The end of sheath 17 and of tube 16 are brazed to diaphragm 21 by a brazing compound which is placed within at least the last complete corrugation of tube 16 before the insertion of diaphragm 21; the brazing compound may be melted in a preliminary heating operation before the assembly of the terminal fitting on the conduit.

Sheath 17 is thus effectively electrically connected to conduit end member 19. As above set out however, it is advantageous from the standpoint of corrosion resistance, to make end member 19, diaphragm 21, and sleeve 22, as well as the housing of fitting 12, of stainless steel and the like. Thus, without the present invention there would be left a zone of substantial length of the conduit element which would be substantially unshielded and which, when the conductor wire carries interrupted or alternating high tension current, thus would constitute an effective source of unwanted electromagnetic radiation.

To overcome such difficulty there is provided, in accordance with the invention, a second inner shielding sheath 25 which is closely disposed about the insulating layer 14 of the conductor wire 13. Sheath 25 may likewise be made of a braided highly conductive wire such as tinned copper or nickel. Each end of sheath 25 extends longitudinally outwardly past joints 20, into proximity to the body of the respective fitting 12, and is very effectively electrically connected in parallel with the outer sheath 17 by being welded to end piece 19 and to sleeve 32 of the fitting 12. Thus, the sheaths 17 and 25 are additive in their shielding functions, and in addition, the length of the conductor which is left uncovered by one or more shielding sheaths is markedly reduced.

In making the element 10, end pieces 19 are preferably first welded and sealed to the ends of conduit 11 in the manner above explained. This removes any possibility of injuring the conductor and its insulation by the heat of making welds 24. The conductor wire with sheath 25 thereon is cut to the proper length and before or after being cut is assembled within the conduit element 10, the insulation 14 is removed from the ends of the wire to allow their subsequent connection to the above mentioned socket contacts, and the sheath 25 is cut back some distance from each end of insulating layer 14. The end of the sheath is then bent or fanned out as shown at 29. If desired, the end of the sheath may be cut longitudinally at one or more zones to facilitate fanning of the end. Preferably, before the sheath is fanned out, a binding 27 is applied tightly over the sheath adjacent the root of the fanned portion. Such binding may be of a suitable material such as fiber glass or metal wire.

As seen in Fig. 2, the outer edge of the fanned-out end portion 29 of sheath 25 overlies the outer annular end surface 30 of end member 19. The sleeve 32 of fitting 12 to which end member 19 is to be attached is preferably, as shown, of substantially greater diameter than the sheath 17 of the conduit or of the sleeve 32 thereon. Thus end member 19 has a first smaller diameter, substantially equal to that of the sleeve 22 at the end thereof confronting the radial flange of diaphragm 21, body 19 tapering outwardly at portion 31 so that its other end has a diameter substantially equal to that of sleeve 32 of fitting 12.

In making the welded connection 37 shown in Figs. 1 and 3, at least the separable, inner portion of fitting 12, which bears sleeve 32, and the confronting end of member 19 secured to the conduit are held in coaxial confronting position in a suitable jig, not shown. The outer ends of the wires of sheath portion 29 are clamped in position between the end surface 33 of sleeve 32 and the end surface 30 of end part 19. Preferably the outer ends of wires in portion 29 of the sheath are cut to lie at least slightly outwardly of the outer peripheral surfaces of sleeve 32 and end piece 19. Welding heat is now applied to the anular zone of the interface between surfaces 30 and 33, as by a "Heliarc" welding apparatus whereby to fuse the adjacent zones of parts 19 and 32 together at an annular weld 37. Such weld not only hermetically seals part 19 to sleeve 32, but also very effectively welds end portion 29 of sheath 25 to both such parts.

It will thus be seen that sheaths 17 and 25 are electrically connected in parallel by parts 19 and 21, so that they function together to shield the conductor wire or cable in an additive manner. Further, since sheath 25 is carried longitudinally to a zone immeditaely adjacent the terminal fitting, and is electrically connected to the metal housing thereof over a large area, the conductor is more efficeintly shielded at the terminal fitting than was possible in prior conduit element constructions.

In Fig. 4 there is shown a fragment of a second embodiment of conduit element made in accordance with the present invention. In Fig. 4 parts of the conduit and of the conductor and its shielding sheath are designated by the same reference characters as in Figs. 1–3, inclusive.

The conduit is provided with an annular metal end member 42 positioned coaxially thereof, such end member being welded, brazed, or soldered to the inner tube 16 and the outer braided sheath 17 of the conduit. An outer sleeve 44 is provided on the conduit, the outer sleeve being secured as by welding to member 42. The shielding sheath 17 is electrically connected to member 42. The braided shielding sheath 25 is fanned out at its end to form a flange portion 45, which overlies the outer end of member 42. Portion 45 may be secured to member 42, as by welding, braking or soldering, so as to make electrical contact therewith. Thus shielding sheaths 17 and 25 are connected in parallel by member 42. When the end of the conduit is to be attached and sealed to an aligned annular member 46, which may be the end portion of a terminal fitting, members 42, 45, and 46 may be welded together at annular zone 47 as by "Heliarc" welding.

The conduit and terminal construction of the invention markedly reduces the loss in transmission, particularly of high frequency electrical currents. This follows from the fact that the inner sheath 25 is of high electrical conductivity, and thus decreases the effective resistance, particularly at high frequencies, of the conduit as a whole.

Althouhg only a limited number of embodiments of the invention have been illustrated in the accompanying drawings and described in the foregoing specification, it is to be expressly understood that various changes, such as in the relative dimensions in the parts, materials used, and the like as well as the suggested manner of use of the apapratus of the invention, may be made therein without departing from the spirit and scope of the invention as will now be apparent to those skilled in the art.

What is claimed is:

1. A shielded conductor element comprising a cable having an insulated conductor wire, an electrically conducting braided metal wire sheath disposed closely about the wire, a conduit having at least one electrically conducting impervious flexible metal tube disposed about the sheath, and a fitting connected to one end of the cable, the fitting including an annular metal housing sleeve disposed adjacent such end of the wire, and an annular metal end piece connected to the conduit, the end piece being electrically connected to the impervious flexible metal tube of the conduit and being positioned coaxial of the housing sleeve, the housing sleeve and the end piece being connected at a joint therebetween, the sheath being connected to the housing sleeve and the conduit at such joint.

2. A shielded conductor element as claimed in claim 1, wherein the conduit includes an impervious inner flexible metal tube and a second, outer electrically conducting metal sheath of high electrical conductivity disposed about the flexible tube, and the metal tube and the metal sheath of the conduit are sealed and electrically connected, respectively, to the end piece.

3. A shielded conductor element as claimed in claim 2, wherein the second, outer electrically conducting metal sheath is made of braided wire.

4. A shielded conductor element comprising a cable having an insulated conductor wire, a first electrically conducting braided metal wire sheath disposed closely about the wire, a conduit having at least one electrically conducting impervious inner flexible metal tube and a second, outer electrically conducting sheath of high electrical conductivity made of braided metal wire, said conduit being disposed about the first sheath, and a fitting connected to one end of the cable, the fitting including an annular metal housing sleeve disposed adjacent such end of the conductor wire, and an annular metal end piece connected to the conduit, the sleeve and the end piece being of substantially greater diameter than the first sheath, the end piece being electrically connected and sealed to, respectively, the impervious flexible metal tube and the second sheath of the conduit and being positioned coaxial of the housing sleeve, the housing sleeve and the end piece being connected at a joint therebetween, the first sheath being connected to the housing sleeve and the conduit at such joint, the end of the first sheath being fanned out toward the joint from its main extent about the conductor wire.

5. A shielded conductor element as claimed in claim 4 wherein the confronting ends of the sleeve and the end piece are of substantially the same diameter and are butt welded together, and the end of the first sheath is interposed between the sleeve and the end piece.

6. A shielded conductor element as claimed in claim 4 comprising a binding around the first sheath at the root of its fanned-out zone.

7. A shielded conductor element as claimed in claim 4 wherein the conduit is of a substantially smaller diameter than the sleeve, the end piece has a greater diameter at the end thereof confronting the sleeve than at the end thereof connected to the conduit, and the end of the first sheath extends and is fanned outwardly in the direction from the conduit toward the fitting.

References Cited in the file of this patent

UNITED STATES PATENTS

| | | |
|---|---|---|
| 1,314,333 | Kahn | Aug. 26, 1919 |
| 2,067,614 | Mascuch | Jan. 12, 1937 |
| 2,113,211 | Lake | Apr. 5, 1938 |
| 2,438,146 | Candee et al. | Mar. 23, 1948 |
| 2,666,657 | Howard et al. | Jan. 19, 1954 |
| 2,762,025 | Melcher | Sept. 4, 1956 |
| 2,781,785 | Davies | Feb. 19, 1957 |

FOREIGN PATENTS

| | | |
|---|---|---|
| 165,488 | Australia | Oct. 5, 1955 |